Patented Feb. 18, 1947

2,416,061

UNITED STATES PATENT OFFICE 2,416,061

CURING OF POLYMERS OF SUBSTITUTED MONOOLEFINIC HYDROCARBONS WITH POLYVALENT METAL COMPOUNDS

Ambrose McAlevy, Daniel E. Strain, and Franklin S. Chance, Jr., Wilmington, Del., ass'gnors to E. I. du Pont de Nemours & Company, Wilmington, Del., a corporation of Delaware No Drawing. Application October 27, 1943, Serial No. 507,874

22 Claims. (Cl. 260—27)

This invention relates to a process for preparing synthetic elastomers and more particularly to their preparation by the curing of substantially saturated high molecular weight polymers from monoolefinic compounds containing a plurality of substituent groups.

The curing of elastomers, including natural rubber, buna rubber, chloroprene rubber, polybutadiene, isobutylene-butadiene interpolymer and the like, has been accomplished hitherto by the use of sulfurizing agents such as sulfur or sulfur chloride. Hitherto, an elastomer could be vulcanized if it could be sulfurized, that is, if it contained olefinic unsaturation which could react with either sulfur or sulfur chloride. Also, chlorinated compounds could be sulfurized by reaction with metal polysulfides, thereby producing products which had certain properties similar to those of rubber.

All of the rubber-like products which have been prepared by means of the sulfurizing reaction have serious limitations. Natural rubber, and the various diene interpolymers, all contain olefinic unsaturation before and after curing. This results in poor aging properties. Furthermore, the maximum tensile strength of sulfurized elastomers is rarely better than 4000–4500 pounds per square inch, which is approximately the tensile strength of best quality tire tread stock rubber. A still more serious limitation on the sulfurized elastomers is their poor heat resistance. It is generally known that vulcanized natural rubber, if heated to temperatures above the optimum vulcanization temperature will degrade or depolymerize to give products of decreasing strength and lower softening temperature.

It is an object of this invention to provide a vulcanized elastomer which does not have the limitations of the sulfurized elastomers described above.

A further object of the invention is to provide valuable products from the polymers of substituted olefinic hydrocarbons which prior to polymerization contain a single ethylenic linkage. Another object of the invention is to provide a procedure whereby polymers of olefinic hydrocarbons containing plasticizing as well as substituent salt-forming groups are cured. Yet another object is to provide cured halogenated polymers from olefinic hydrocarbons, which prior to polymerization contained a single ethylenic linkage and which polymers likewise contain substituent salt-forming groups. Other objects and advantages of the invention will be more fully particularized hereinafter.

In accord with its simplest aspects, the invention may be characterized as involving the curing of polymers which prior to polymerization contain a monoethylenic linkage; their curing being made possible because of substituent groups which are attached to the polymeric chain and in addition the invention provides cured elastomers having many properties equal to and some superior to those of natural and synthetic rubbers.

The two classes of substituents used in accord with the process of the invention are, for clarity and simplicity in their consideration, characterized as first class and second class substituents; the members of the first class impart elastic properties to the final product and the members of the second class or salt-forming substituents impart curing properties to the polymer.

The simplest member of the first class that aids in inducing elasticity is a halogen group, which may be formed in accord with the process described in U. S. Patent No. 2,183,556, issued to E. W. Fawcett, or by any other suitable process for obtaining halogenated polymers of the olefinic hydrocarbons such as ethylene, propylene, isobutylene, and similar hydrocarbons. These polymers may likewise be obtained directly by the polymerization of vinyl chloride, vinyl chloracetate, vinylidene chloride (preferably interpolymerized with known interpolymerizing agents to give the desired chlorine content), the halogenation of a polyvinyl alcohol or by any other suitable process whereby a polymer is obtained containing the hereinafter specified amount of halogen such as chlorine required to give elasticity to the resulting product. Other substituents will likewise impart elasticity to the ultimate product and as examples of these may be indicated hydrocarbon side-chain groups such as methyl, ethyl, benzyl; acyloxy groups such as, for example, acetate, propionate, isobutyrate, and the like. Polymers containing these groups are usually, but not necessarily, formed by polymerizing a monomeric compound containing the substituent groups rather than by inserting the groups by chemical means after the polymer has been formed. For example, compounds containing the acetate group are provided by copolymerization of vinyl acetate or vinyl chloracetate with ethylene, the propionate group by the copolymerization of vinyl propionate with ethylene, and so forth. The hydrocarbon side-chain group is obtained in the desired amount (described below) by polymerizing a suitable olefine or unsaturated compound such for example, as propylene, isobutylene, styrene, and the like with the hydrocarbon containing a monoethylenic linkage.

Preparations of several ethylene copolymers which contain groups of the first class are disclosed in the following copending applications of W. E. Hanford: S. N. 417,476, filed November 1, 1941; S. N. 417,477, filed November 1, 1941, and S. N. 446,116, filed June 6, 1942.

Substituents of the second class that impart curing properties are provided by reacting the monoolefinic hydrocarbon or its substitution products, prior, during or subsequent to polymerization with a compound capable of introducing salt forming groups. This substituent may be introduced by subjecting the polymers having substituents of the first class to treatment under suitable conditions with sulfonating, phosphating, chlorosulfonating, chlorophosphonating, phosphonating, chlorocarboxylating, or carboxylating agents, or agents that will introduce a hydrogen sulfate group, all of which result in the addition of a group which may be designated by the structure $-XO_nY_m$ in which X is sulfur, phosphorus, or carbon: O is oxygen; Y is hydrogen, a hydroxyl or a halogen group; $n$ is 0, 1, 2 or 3; and $m$ is 1 or 2. For example, $-XO_nY_m$ may designate such groups as $SO_3H$, $SO_2Cl$, $POCl_2$, and $COOH$. Alternatively, this substituent may be present in the monomer prior to vulcanization, as for example in the preparation of isobutylene-methyl methacrylic acid interpolymers.

Both groups may be introduced into an olefine polymer simultaneously. For example, the chlorosulfonyl group may be introduced by the process disclosed in U. S. Patent No. 2,212,786, issued to D. M. McQueen, which provides products exceptionally well adapted for the preparation of superior products by curing in accord with the invention. The phosphonic groups may be introduced by chlorination of a polymer of ethylene in carbon tetrachloride which contains phosphorus oxychloride, while the chlorcarboxyl groups may be introduced by chlorination of polythene in the presence of phosgene, or alternatively by the chlorcarboxylation method of Kharasch and Brown, described in the Journal of the American Chemical Society, vol. 62 (1940, page 454), and their U. S. Patent No. 2,326,229.

A useful method for introducing a substituent of the second class into a saturated rubbery resin like chloropolythene or polyisobutylene is to dissolve or suspend the resin in carbon tetrachloride, and, while stirring the solution or suspension very rapidly, to add a suspension of oleum or chlorosulfonic acid in carbon tetrachloride thereto. After the reaction, the solvent and unreacted acid are removed from the product by steaming. In a similar manner, polythene may be treated with chlorosulfonic acid to introduce this substituent, and subsequently the sulfonated polythene may be chlorinated in carbon tetrachloride solution to introduce the substituent of the first class. Furthermore, polythene may be chlorinated in carbon tetrachloride solution in the presence of sulfur, a sulfur halide or a sulfur oxychloride, and the resulting rubbery resin may be steamed to cause the sulfur-bearing substituent group to be converted to a second class group.

The product prepared by any of the methods described above which contains at least one of the first and at least one of the second class of groups, and which is basically a polymer of a monoolefinic hydrocarbon can be cured to give valuable elastomers. In this application and the claims appended thereto the term "curing" will be used to mean that the polymer treated has imparted to it improved properties especially with respect to greater solvent resistance, higher tacking point, less plastic flow, improved elasticity and increased tensile strength.

The amount of the first class substituent to be used will be determined in large measure by the degree of elasticity desired in the final product, and in the nature of the substituent groups. When these substituent groups on a polymethylene chain are chlorine groups, rubbery vulcanizates having optimum elastic properties are obtained when the ratio of substituent chlorine atoms to carbon in the chain is in the range between 1 to 4 and 1 to 8. More broadly speaking and on a percentage basis they may contain from 20 to 45% chlorine. Similarly when the first class substituent is the acetate group, the optimum ratio of acetate to carbon atoms in the chain is in the range between 1 to 6 and 1 to 14. While we do not wish to be bound by any theory, it appears that groups which are less polar, such as the methyl group, must be more numerous along the chain to produce the desired elastic effect, for, whatever the cause, the optimum ratio of methyl groups, substituted along a polymethylene chain, to carbon atoms in the chain is about 1:1. More than one variety of the first class group may be present in the resin. For example, methyl groups and chlorine groups or acetate groups and chlorine groups may be present simultaneously. Under such circumstances, the frequence of substitution of the various first class groups along the chain is preferably in inverse proportion to their relative powers to produce the desired elastic effect individually as described above. Thus, a substituted polymethylene which contained one acetate group per twenty-six carbon atoms in the chain and one chlorine group per seven carbon atoms in the chain was found to have a suitable amount for the preparation of high quality elastomers. While the ratio of the number of carbon atoms in the chain to the number of substituent first class groups is given above in terms of optimum ratios it should be pointed out that elastomers may be made in which the ratio of the number of carbon atoms in the chain to the number of substituted groups is outside of the optimum range. In fact there is a gradation in the degree of rubberiness as the ratio varies from the optimum range to a lesser degree of substitution, until finally the properties become those of polyethylene which is a relatively stiff, slightly elastic resin, furthermore there is a gradation in the degree of rubberiness as the ratio varies from the optimum range to the range of maximum substitution. Products which approach the maximum degree of substitution along a polymethylene chain are generally brittle and glassy and not of great value as elastomer intermediates. This is particularly true if the second class substituted group is polar, like the chlorine or acetate group. Nevertheless, the principle of this invention may be applied over the entire range of degree of substitution of a polymethylene chain by groups of this class, provided second class, salt-forming groups are also present.

The optimum number of second class groups that promote curing is determined by the molecular weight of the elastomer and the nature of the rubbery product desired. In general, the optimum average number of salt-forming groups per molecule is between 2 and 50 for polymers having from 600 to 5000 carbon atoms in the chain, and is inversely proportional to the number of carbon atoms in the chain. A suitable average number for a chain containing 1000 carbon atoms would be between 4 and 7. Methods for preparing elastomers containing this number of groups per 1000 carbon atoms in the chain are hereinafter disclosed.

Thus, for chlorosulfonated polymers of ethylene prepared in accord with the process described in U. S. Patent 2,212,786 from polythene which has a molecular weight of 14,000, and which contains 30% chlorine, the optimum range of combined sulfur content for the preparation of elastomers in accordance with this invention is 0.4 to 3.0%. When the degree of salt-forming substitution is less than is indicated by 0.4% sulfur, a large part of the elastomer is unvulcanizable, as evidenced by the quality of the total vulcanizate, i. e. it lacks snap, is partly soluble in organic solvents and otherwise displays the behavior of elastomers which possess a large proportion of organic filler.

The curing operation is best conducted by compounding the substituted polymer with a vulcanization mix containing an oxide of a polyvalent metal and other curing aids herein described, followed by subjecting the mix to heat and pressure. The heating may, if desired, be applied subsequently or simultaneously with the mixing.

The metal oxide preferred for use in the vulcanization mix is litharge, although good results are also obtained with magnesia, zinc oxide, red lead and barium oxide and other polyvalent metal oxides, particularly divalent metal oxides. Equivalents of the oxides in this invention are the hydroxides, and the salts thereof with weak acids such as zinc stearate, lead abietate, magnesium adipate, and calcium carbonate. Of these salts, the lead and zinc salts of high molecular weight weak acids particularly naphthenic, abietic and stearic are most suitable. In addition to the metal oxide, the vulcanization mix may contain a weak monobasic or polybasic acid of high molecular weight, such as stearic acid or rosin. Small amounts of antioxidants and/or accelerators may also be used, such as diphenyl guanidine, mercaptobenzothiazole, tetramethyl thiuramdisulfide, phenyl beta naphthyl amine, or high molecular weight phenolic compounds. Fillers or reenforcing agents such as carbon black, barium sulfate, kaolin, diatomaceous earth, powdered talc, titanium dioxide, and calcium sulfate may be used. Sulfur may also be included in the vulcanization mix, but it is generally omitted since the vulcanization reaction takes place readily in the absence of free sulfur. The quantities of these agents which give best results are, per 100 parts of substituted polymer: oxide of di or polyvalent metal, 2 to 60 parts, preferably 10 to 20 parts and with litharge especially 30 to 60 parts; rosin, or equivalent, 0 to 30 parts, preferably 5 to 10 parts; antioxidant, 0.0 to 3.0 parts, preferably 0.5 to 2.0 parts; accelerator, 0 to 8 parts, preferably 1 to 5 parts; inorganic fillers, organic fillers or reenforcing agents 0 to 500 parts, preferably 0 to 30 parts.

For certain special applications, in which products having reduced stiffness are required, organic fillers or extenders may be added to the vulcanization mix. These include asphalt, polyisobutylene, Naftolens (which are products derived from the acid sludge in oil refining and marketed by Wilmington Chemical Corporation), factice, pine tar, and Flexalin (diethylene glycol abietate, marketed by Hercules Powder Company). These organic fillers or extenders may be employed in quantity equivalent to from 0 to 100 parts per 100 parts of elastomer, but preferably from 0 to 20 parts per 100 parts of elastomer.

The unmixed elastomers containing elastomer groups and salt-forming groups as above described may be converted in the absence of metal oxide or vulcanization aid, to products of lesser solubility and increased resilience by heating to 100 to 300° C., but the products thus obtained often lack strength, and are inferior to the cured products obtained from the compounded elastomers.

The substituted polymers are compounded in preparation for curing by mixing them with the desired amounts of compounding ingredients on regular rubber mill rolls which compounding may be effected at room temperature or above. The product is then cured by heating at a temperature of 100° C. to 160° C. for a period in the order of 10 to 60 minutes, under a pressure of from about 15 to 500 pounds per square inch. If it be desired to prepare shaped articles the milled product is cured in a suitable heated mold under pressure. Usually there is evidence of curing as the temperature approaches approximately 60° C., although temperatures of 100° C. or slightly higher are sometimes required. There is generally no need for temperatures in excess of 180° C., and temperatures in excess of 300° C. cause degradation of the elastomer.

It is frequently desirable to add other compounding agents such as lubricants, stabilizers, hydrogen chloride inhibitors, blowing agents when sponge is desired, other fillers and the like to improve the texture and aging properties of the cured stock. The curing procedure is also subject to wide variation as will be appreciated from Example 1, both in regard to length and temperature of treatment, and may be carried out in a mold in the presence or in the absence of external pressure, as for example, in the preparation of spongy articles where a blowing agent is employed.

As a result of the heat and pressure treatment a pronounced reaction occurs in each instance yielding a product which has properties resembling the properties of vulcanized rubber. These cured products differ markedly from the uncured elastomer in a number of respects including considerably increased resistance to cold flow, and increased tendency to return to original dimensions after deformation by stress.

Examples will now be given illustrating preferred embodiments of the invention in which parts are by weight unless otherwise indicated. The following list indicates the nature of certain ingredients referred to in the examples; AgeRite Alba, a trade name for hydroquinone monobenzyl ether; Captax, mercaptobenzothiazole, marketed by R. T. Vanderbilt Co.; Pexite I, a refined rosin marketed by Hercules Powder Company.

*Example 1.*—A solution containing 25 parts ethylene polymer, which has a molecular weight of 20,000–25,000, and 670 parts carbon tetrachloride is stirred rapidly at the boiling point of the solvent while 24.9 parts chlorine and 6.7 parts sulfur dioxide are bubbled into the mixture. A type $H_4$ mercury vapor lamp is used to irradiate the reactants. After 21 minutes, during which time the temperature is allowed to drop to 40° C., the reaction is complete. Removal of the solvent is accomplished by steam distillation, following which the rubbery residue is washed with water to remove water-soluble acids. The product is milled for 45 minutes on a rubber mill at 100–130°

C. so as to obtain a dry rubbery mass, which contains 27.6% combined chlorine and 2.76% combined sulfur. This analysis corresponds to 6.2 carbon atoms per chlorine group, and 56 carbon atoms per sulfonic group. To 100 parts of this material is added one part AgeRite Alba, 1 part Captax, 10 parts wood rosin and 40 parts litharge, and these ingredients are mixed together by means of a rubber mill. The mixture is then cured in a mold for 60 minutes at 125° C. The resulting vulcanizate has a tensile strength of 5400 pounds per square inch and an elongation at break of 335%. Prior to the break, the sample has a modulus of 4900 pounds per square inch at 300% elongation.

*Example 2.*—Twenty-five parts of an ethylene polymer having a molecular weight of 12,000–15,000 is dissolved in 800 parts of carbon tetrachloride in a Pyrex vessel at 77° C. To the solution is added 15 parts sulfuric oxychloride, and the mixture is stirred rapidly while being irradiated by means of a 300-watt tungsten filament incandescent lamp. Under these reaction conditions 40.5 parts of chlorine are introduced over a period of one hour. The resinous product is then precipitated by adding 1600 parts of methanol, and the precipitate is washed several times with methanol. Finally the product is freed of volatile matter by drying in a vacuum oven at 50° C. This gives a rather stiff rubbery resin which contains 47.0% chlorine and 0.56% sulfur. To 100 parts of this resin is added 5 parts wood rosin, 2 parts phenyl beta naphthylamine, 1 part sulfur, 10 parts zinc oxide. These ingredients are milled together on a rubber mill, and the mixture is then placed in a mold and heated at 125° C. for 60 minutes. The resulting rubber-like vulcanizate has a tensile strength of 3100 pounds per square inch and an elongation of 450% at the break-point. After the break, the vulcanizate retains a residual elongation of 25%.

*Example 3.*—A stream of chlorine (1.05 parts per minute) is conducted into a rapidly stirred solution containing 50 parts of ethylene polymer (having a molecular weight of 12,000 to 15,000) in 1600 parts of carbon tetrachloride, and 10 parts of thionyl chloride. Temperature is maintained at 77° C. After one hour the chlorination is stopped and the solvent is removed from the mixture by steam distillation. The product is washed several times with warm water, then is milled for 35 minutes at 70° C. on the rubber mill. The rubbery product which results is shown by analysis to contain 34.1% chlorine, and 1.14% sulfur. A film of this rubbery material is heated at 120° C. for 24 hours. A dark, tough, elastic film which resembles vulcanized rubber is thus obtained.

*Example 4.*—A sample of chlorosulfonated ethylene polymer prepared by the general method described in U. S. Patent No. 2,212,786, from polythene having a molecular weight of 10,000, contains 34.9% chlorine and 0.4% sulfur. This analysis corresponds to 4.7 carbon atoms per chlorine group, and 372 carbon atoms per sulfonic group, or 1.9 sulfonic groups per molecule of resin. Since this sulfur content is a few tenths of a percent lower than is required for preparation of the best quality elastomers, the sample is dissolved in carbon tetrachloride (125 parts chlorosulfonated polythene per 1400 parts carbon tetrachloride), and 50 parts sulfuric oxychloride are added. The mixture is heated for 2 hours at 76° C. in the presence of diffuse daylight. The solvent is then removed by steam distillation and the residual resin is washed with warm water until free of soluble acid. Finally the resin is dried on the rubber mill. The product contains 34.0% chlorine and 0.76% sulfur. To 100 parts of this rubbery product are added 2 parts phenyl beta naphthyl amine, 15 parts of wood rosin, and 5 parts of magnesia. This mixture, after being milled on the rubber mill, is cured for 60 minutes at 155° C. The resulting cured elastomer has a tensile strength of 2400 pounds per square inch and an elongation of 600% at the break-point.

*Example 5.*—A solution containing 25 parts polyisobutylene (molecular weight, 140,000) in 600 parts by volume carbon bisulfide is stirred very rapidly while a suspension of 2 parts chlorosulfonic acid in 50 parts by volume carbon bisulfide is introduced. Temperature is maintained at 46° C. After 2.5 hours the solvent is removed by steam distillation, and the rubbery product is washed free of soluble acid with water. The resin is then dried on the rubber mill, yielding a rubbery mass which contains 0.38% combined sulfur. To 100 parts of this material the following ingredients are added: 50 parts channel black, 1 part Captax, 10 parts wood rosin, 40 parts litharge, 5 parts zinc oxide, 6 parts dipentamethylene thiuram tetrasulfide, and 3 parts of sulfur. When these ingredients are thoroughly mixed the mixture is placed in a mold and vulcanized for 60 minutes at 145° C. The resulting rubbery product has a tensile strength of 850 pounds per square inch and an elongation of 800% at the break point.

*Example 6.*—A solution containing 25 parts of a vinyl chloride-ethylene copolymer (chlorine content, 20%; molecular weight, 20,000–22,000) in 1200 parts of boiling carbon tetrachloride is treated with 15 parts of chlorine and 7 parts of sulfur dioxide under radiation from a 300-watt tungsten filament lamp. The product is precipitated by addition of methanol. After drying in a vacuum oven, it is found to contain 32.0% chlorine and 1.26% sulfur. The product is cured in the manner described in Example 1 for the curing of chlorosulfonated polythene. The product closely resembles cured chlorosulfonated polythene.

*Example 7.*—Twenty-five parts of an ethylene polymer (molecular weight 20,000–25,000) are dissolved in a mixture containing 800 parts of carbon tetrachloride and 5 parts of phosphorus oxychloride at 77°, and to the solution 43.9 parts of chlorine are added. The product, isolated by steam distilling the solvent and washing several times with water, is milled dry on the rubber mill. It is an elastic, but rather stiff solid, which analyzes 40.0% chlorine and 0.76% phosphorus combined as phosphoric group. This chlorophosphonated polythene is milled with one half of its weight of magnesia, then heated in a mold at 120° C. A mixture of vulcanized and unvulcanized elastomer results.

*Example 8.*—A solution of 25 parts of polyisobutylene (molecular weight 140,000) in 800 parts of carbon tetrachloride is rapidly stirred at 35 to 40° C., and a mixture containing 2.4 parts chlorine and 4.4 parts sulfur dioxide is introduced. The introduction of these gases requires 10 minutes, throughout which time the reaction mixture is irradiated by means of a type H4 100-watt mercury vapor lamp. The solvent is thereafter removed by steam distillation, and the resulting resin is washed free of water-soluble acid. Finally the resin is dried on a rubber mill at 100° C. The product contains 2.65% chlorine and 0.48% sulfur combined as sulfonic group.

To 100 parts of this resin is added 20 parts channel black, 1 part Captax, 10 parts wood rosin, 40 parts litharge, 5 parts zinc oxide and 3 parts dipentamethylenethiuram tetrasulfide, and the mixture is milled on the rubber mill. Finally it is cured in a mold for 60 minutes at 135° C., yielding a product which has a tensile strength of 700 pounds per square inch and an elongation of 800% at the break-point. After the break, this rubbery product snaps back to a residual elongation of 50%.

*Example 9.*—An ethylene-vinyl acetate interpolymer which contains 12 ethylene units per unit of vinyl acetate, and which has an average molecular weight of approximately 20,000 is dissolved in carbon tetrachloride, forming a solution which contains 25 parts of the interpolymer per 800 parts of the solvent. Into this solution 22 parts of chlorine and 2 parts of sulfur dioxide are introduced simultaneously at 77° while the mixture is being irradiated by means of a type $H_4$ 100-watt mercury vapor lamp. After 15 minutes the solvent is removed from the mixture by steam distillation, and the resulting resin is washed free of water-soluble acids. This resin is dried on the rubber mill at 90° C. A tough rubbery product which contained 22.8% chlorine and 1.0% sulfur is thus obtained. This product prior to curing has a tensile strength of 400 pounds per square inch and an elongation of 1400% at the break point, returning after the break to a residual elongation of 100%. This material is cured by compounding with 1 part AgeRite Alba, 1 part Captax, 10 parts wood rosin and 40 parts litharge, followed by heating in a mold for 60 minutes at 135° C. The cured product has a tensile strength of 4050 pounds per square inch and an elongation of 500% at the break point. The residual elongation after the break is 45%.

*Example 10.*—A solution of 25 parts of a chlorinated polymer of ethylene (chlorine content, 26%; molecular weight 15,000–18,000) in 800 parts carbon tetrachloride is very rapidly stirred while 4.3 parts chlorosulfonic acid is added dropwise, this addition requiring about 60 minutes. During this time the temperature is kept within the range 30–70° C. When the reaction is complete the solvent is removed from the dissolved resin by steam distillation, and the residual rubbery mass is thereafter washed with water until free of water-soluble acid. It is then dried on the rubber mill. This gives a product which contains 25.7% chlorine and 0.9% sulfur, combined as sulfonic group. It is cured by compounding with 1 part AgeRite Alba, 1 part Captax, 10 parts wood rosin and 40 parts litharge, followed by heating in a mold for 60 minutes at 135° C. The resulting cured elastomer has a tensile strength of 1500 pounds per square inch and an elongation of 550% at the break point.

*Example 11.*—One lot of chlorosulfonated ethylene polymer, prepared from polythene having a molecular weight of 40,000–45,000 by the general method described in U. S. Patent 2,212,786, has a chlorine content of 30% and a sulfur content of 1.7%. This analysis corresponds to 5.7 carbon atoms per chlorine group, and 91 carbon atoms per sulfonic group, which amounts to between 31 and 35 sulfonic groups per resin molecule. One hundred parts of this material is compounded on the rubber mill with 1 part AgeRite Alba, 1 part Captax, 10 parts Pexite I, and 40 parts of litharge. The mixture is then cured for 60 minutes at 135° C. The resulting elastomer has a tensile strength of 5000 pounds per square inch and an elongation of 400% at break. After the break it retains a residual elongation of 30 percent.

*Example 12.*—100 parts of chlorosulfonated ethylene polymer containing 28% chlorine and 1.4% sulfur was compounded with 0.5 part Latac (hexamethyleneammonium hexamethylenedithiocarbamate) 1 part Captax, 10 parts rosin and 40 parts litharge and cured 60 minutes at 135° C. The tensile strength was 2750 pounds per square inch at 425% elongation with recovery to 35% residual elongation. This product gave a compression set value of 20% (A. S. T. M. method D395–40T, procedure a). After heating for 1 week at 90° C., the compression set was improved to 7%. This is an exceptionally good compression set value, comparing to 15% for well cured tread stock rubber using the same test procedure.

A similar composition using only 0.25% Latac was well cured on heating for 3 to 5 minutes at 155° C.

*Example 13.*—100 parts of chlorosulfonated ethylene polymer containing 30% chlorine and 0.9% sulfur was compounded with 1 part AgeRite Alba, 1 part Captax, 10 parts rosin and 40 parts minium ($Pb_3O_4$) and cured 60 minutes at 155° C. The tensile strength was 2900 pounds per square inch at 525% elongation with recovery to 50% residual elongation. This formula gave a lower modulus stock with better compression set than when litharge was used in place of minium. The compression set value was 36% and improved to 20% on heating 1 week at 90° C. A similar composition with litharge in place of minium gave an original compression set value of 50%.

*Example 14.*—100 parts of chlorosulfonated ethylene polymer containing 30% chlorine and 0.8% sulfur was compounded with 0.5 parts diphenyl guanidine, 10 parts magnesium oxide and 5 parts $(NH_4)_2CO_3$, and cured 60 minutes at 145° C. The vulcanizate had a tensile strength of 1400 pounds per square inch at 700% elongation with recovery to 30% elongation.

*Example 15.*—A product containing 30% chlorine and 0.3% sulfur was prepared by chlorinating ethylene polymer (75 parts) at 77° C. in carbon tetrachloride solution (2400 parts) containing sulfur dichloride (5 parts). This product was isolated from the chlorination mixture by injecting steam until all of the solvent had been removed, after which the steaming was continued until the condensed steam was essentially free of acid. The product was a rubbery resin which could be dried on the rubber mill. On compounding 100 parts of this rubbery material with 1 part AgeRite Alba, 1 part Captax, 10 parts rosin and 40 parts litharge, and curing for 60 minutes at 155° C., a vulcanizate with a strength of 1500 pounds per square inch at 750% elongation was obtained.

*Example 16.*—A solution of 100 parts of chlorinated ethylene polymer (40% chlorine), 5 parts hydrogen sulfide and 0.5 parts ferric chloride in 800 parts carbon tetrachloride was heated in a closed vessel at 145° to 152° C. for 2 hours. The resulting solution was removed from the reaction vessel and was thereafter treated with steam to remove solvent, whereby a rubbery resin was obtained. After being washed with water, then dried on the rubber mill, this rubbery material contained 42% chlorine, and 0.7% sulfur combined as hydrosulfide. 100 parts of this product was compounded with 0.2 parts tetramethylthiuramdisulfide, 0.5 parts diphenyl guanidine, 10 parts zinc oxide, 30 parts channel black and cured 60 minutes at 155° C. The tensile strength was 1750 pounds per square inch at 400% elongation with recovery to 45%.

*Example 17.*—Chlorinated ethylene polymer (40 parts, 40% chlorine) was treated with 5 parts ethandithiol in carbon tetrachloride (1600 parts) for 3 hours at 75° C. in the presence of 0.5 parts of ferric chloride catalyst. The product, isolated as described in the preceding example, contained 40% chlorine and 7.7% sulfur. 100 parts of this product was compounded with 1 part Altax, 40 parts litharge, and 3 parts rosin, and cured 60 minutes at 175° C. The tensile strength was 500 pounds per square inch at 725% elongation with recovery to 25% residual elongation.

Vulcanized chlorosulfonated polythene, prepared by the method disclosed in Example 11 is in certain respects a superior elastomer to vulcanized natural rubber or hitherto known vulcanized synthetic rubbers. For example, in resistance to elevated temperatures vulcanized chlorosulfonated polythene is markedly superior to the sulfurized elastomers. A test which demonstrated this point was carried out as follows: A sample of high quality tread stock natural rubber vulcanizate which had a tensile strength of 4000 pounds per square inch was stored in an oven at 90° C. for one week. A sample of chlorosulfonated polythene vulcanizate prepared by the general method disclosed in Example 11 had a tensile strength of 4500 pounds per square inch; this also was stored for one week at 90° C. At the end of the test period the tensile strength of the natural rubber vulcanizate had declined to 900 pounds per square inch, but the chlorosulfonated polythene vulcanizate still had a tensile strength of 4350 pounds per square inch.

The chlorosulfonated polythene vulcanizate, prepared by the general method disclosed in Example 11, is superior to vulcanized rubber in several important respects including the following (1) heat resistance, (2) water resistance, (3) abrasion resistance, (4) resistance to oxidation, (5) resistance to hydrocarbon oils, (6) resistance to breakage by flexing, (7) tensile strength, and (8) fatigue resistance, and (9) color, and stability.

Since the products of this invention vary from soft, elastic materials to hard, horny substances resembling hard rubber, and since they can be prepared in any desired shape by molding, they are useful in numerous fields where their pliability, solvent resistance, nonthermoplasticity, or rubber properties make them applicable. Among the uses for the pliable compositions are bathing apparel (belts, caps, capes, etc.), dental goods (dental dams), drug and surgical supplies (sheeting, tubing, teething rings, nipples, ice bags, etc.), flooring (floor mats, stair treads), footwear (rubbers, heels, taps, impregnated soles, etc.), household items (jar rings, bottle caps, buttons, coasters, fly swatters, wedges, sink stoppers, aprons, gloves, kneeling pads, ash trays, mats, plate wipers, etc.), insulated wire and cable, laboratory supplies (tubing, stoppers, aprons), coated fabrics, latex products (can closures, jar rings, etc.), mechanical goods (belting, hose, mountings, gaskets, valve discs rolls, washers, grommets, auto mats, pedal rubbers, tires for toys, tank linings, windshield wipers, etc.), proofed goods (auto fabrics, crib sheets, shower curtains, raincoats, etc.), sponge rubber products (arm rests, cushions, sponges, mats, tops, baseball plates, etc.), stationer's goods (typewriter feet, telephone bases, coin mats, cord protectors, etc.), thread, tops and novelties (dolls, molded toys, balls, dog toys, sponge novelties, etc.), vehicle accessories (top dressing, tires, pedal pads, etc.).

The hard rubber like products are useful as binders for paint brush bristles, battery cases, insulators and the like.

We claim:

1. A process for the preparation of rubber-like compositions which comprises curing at a temperature between 125 and 175° C., and under a pressure of from 15 to 500 pounds per square inch for from 15 to 60 minutes, an intimate mixture of the approximate composition: 100 parts of chlorosulfonated polymer of ethylene containing 20 to 45% chlorine and from 0.4 to 3% sulfur, one part of mercaptobenzothiazole, one part of hydroquinone monobenzyl ether, 10 to 15 parts of wood rosin and 20 to 40 parts of litharge.

2. A process for the preparation of rubber-like compositions which comprises milling a mixture of halogenated polymer of ethylene having a salt-forming constituent other than a halogen with an accelerator and a polyvalent metal oxide, and subsequently subjecting the resulting milled product to a temperature between 125 and 175° C., a pressure between 15 and 500 pounds per square inch for between 15 and 60 minutes the composition containing per 100 parts of the substituted polymer from 10 to 60 parts of the polyvalent metal oxide.

3. A rubber-like composition comprising a mixture, cured by heating to a temperature between 60 and 300° C., of a substituted polymer of a monoolefinic hydrocarbon selected from the group consisting of ethylene, propylene and isobutylene the polymer having a salt-forming substituent other than a halogen and a substituent selected from the group consisting of halogen, hydrocarbon and acyloxy groups, the combination containing per 100 parts of the substituted polymer from 10 to 60 parts of a polyvalent metal compound selected from the group consisting of polyvalent metal oxides and polyvalent metal hydroxides.

4. A rubber-like composition comprising a halogenated polymer of ethylene having a salt-forming substituent other than a halogen, the composition containing per 100 parts of the substituted polymer from 10 to 60 parts of a polyvalent metal compound selected from the group consisting of polyvalent metal oxides and polyvalent metal hydroxides, the composition having been cured by heating to a temperature between 60 and 300° C.

5. A rubber-like composition comprising a chlorinated polymer of ethylene having a salt-forming substituent other than a halogen, the composition containing per 100 parts of the substituted polymer from 10 to 60 parts of a polyvalent metal compound selected from the group consisting of polyvalent metal oxides and polyvalent metal hydroxides, the composition having been cured by heating to a temperature between 60 and 300° C.

6. A rubber-like composition comprising a substituted polymer of ethylene having a hydrocarbon substituent and a salt-forming substituent other than a halogen the composition containing per 100 parts of the substituted polymer from 10 to 60 parts of a polyvalent metal compound, selected from the group consisting of polyvalent metal oxides and polyvalent metal hydroxides, the composition having been cured by heating to a temperature between 60 and 300° C.

7. A rubber-like composition comprising a substituted polymer of ethylene having an acyloxy substituent and a salt-forming substituent other than a halogen, the composition containing per 100 parts of the substituted polymer from 10 to 60 parts of a polyvalent metal compound selected from the group consisting of polyvalent metal oxides and polyvalent metal hydroxides, the composition having been cured by heating to a temperature between 60 and 300° C.

8. A rubber-like composition comprising a chlorinated polymer of ethylene having a salt-forming substituent other than a halogen the composition containing per 100 parts of the substituted polymer from 10 to 60 parts of a polyvalent metal oxide, the composition having been cured by heating to a temperature between 60 and 300° C.

9. A rubber-like composition comprising stearic acid and a chlorinated polymer of ethylene having a salt-forming substituent other than a halogen the composition containing per 100 parts of the substituted polymer from 10 to 60 parts of a polyvalent metal oxide, the composition having been cured by heating to a temperature between 60 and 300° C.

10. A rubber-like composition comprising a mixture, cured by heating to a temperature between 60 and 300° C., of a halogenated polymer of ethylene that contains the substituent group $SO_nY_m$ in which S is sulfur, O is oxygen, Y is a halogen, $n$ is a symbol from 1 to 3, and $m$ is a number from 1 to 2, the composition containing per 100 parts of the substituted polymer from 10 to 60 parts of a polyvalent metal compound selected from the group consisting of polyvalent metal oxides and polyvalent metal hydroxides.

11. A rubber-like composition comprising a mixture cured by heating to a temperature between 60 and 300° C., of rosin and a halogenated polymer of ethylene that contains the substituent group $SO_nY_m$, in which S is sulfur, O is oxygen, Y is a halogen, $n$ is a symbol from 1 to 3; and $m$ is a numeral from 1 to 2, the composition containing per 100 parts of the substituted polymer from 10 to 60 parts of a polyvalent metal oxide.

12. A rubber-like composition comprising a mixture, cured by heating to a temperature between 60 and 300° C., of rosin, an antioxidant and a halogenated polymer of ethylene that contains the substituent group $SO_nY_m$, in which S is sulfur, O is oxygen, Y a halogen, $n$ is a symbol from 1 to 3, and $m$ is a numeral from 1 to 2, the composition containing per 100 parts of the substituted polymer from 10 to 60 parts of a polyvalent metal oxide.

13. A rubber-like composition comprising a mixture, cured by heating to a temperature between 60 and 300° C., of rosin, an antioxidant, an accelerator and a halogenated polymer of ethylene that contains the substituent group $SO_nY_m$, in which S is sulfur, O is oxygen, Y is a halogen, $n$ is a symbol from 1 to 3, and $m$ is a numeral from 1 to 2, the composition containing per 100 parts of the substituted polymer from 10 to 60 parts of a polyvalent metal oxide.

14. A rubber-like composition comprising a mixture, cured by heating to a temperature between 60 and 300° C., containing from 2 to 60 parts of a polyvalent metal oxide, up to 30 parts of rosin, up to 3 parts of an antioxidant, and up to 8 parts of an accelerator per 100 parts of a halogenated polymer of ethylene that contains the substituent group $SO_nY_m$, in which S is sulfur, O is oxygen, Y is a halogen, $n$ is a symbol from 1 to 3, and $m$ is a numeral from 1 to 2.

15. A rubber-like composition comprising a mixture, cured by heating to a temperature between 60 and 300° C., containing from 10 to 20 parts of litharge, from 5 to 10 parts of rosin, from 0.5 to 2 parts of an antioxidant, and from 1 to 5 parts of an accelerator per 100 parts of a halogenated polymer of ethylene that contains the substituent group $SO_nY_m$, in which S is sulfur, O is oxygen, Y is a halogen, $n$ is a symbol from 1 to 3, and $m$ is a numeral from 1 to 2.

16. A rubber-like composition comprising a mixture, cured by heating to a temperature between 60 and 300° C., of a polymer of ethylene which has been combined with chlorine and sulfur dioxide, the composition containing per 100 parts of the substituted polymer from 10 to 60 parts of a polyvalent metal compound selected from the group consisting of polyvalent metal oxides and polyvalent metal hydroxides.

17. A rubber-like composition comprising a mixture, cured by heating to a temperature between 60 and 300° C., of a polyvalent metal compound and a chlorosulfonated polymer of ethylene, the composition containing per 100 parts of the substituted polymer from 10 to 60 parts of the polyvalent metal compound selected from the group consisting of polyvalent metal oxides and polyvalent metal hydroxides.

18. A rubber-like composition comprising a mixture, cured by heating to a temperature between 60 and 300° C., of a polyvalent metal oxide and a polymer of ethylene containing from 20 to 45% combined chlorine and from 0.4 to 3% of combined sulfur, the composition containing per 100 parts of the substituted polymer from 10 to 60 parts of the polyvalent metal oxide.

19. A rubber-like composition comprising a mixture, cured by heating to a temperature between 60 and 300° C., of a polyvalent metal oxide and a polymer of ethylene containing 30% combined chlorine and 0.6% combined sulfur, the composition containing per 100 parts of the substituted polymer from 10 to 60 parts of the polyvalent metal oxide.

20. A rubber-like composition which comprises a halogenated polymer of ethylene that contains combined phosphorus, the composition containing per 100 parts of the substituted polymer from 10 to 60 parts of a polyvalent metal compound selected from the group consisting of polyvalent metal oxides and polyvalent metal hydroxides, the composition having been cured by heating to a temperature between 60 and 300° C.

21. A process which comprises heat-curing at a temperature between 100 and 175° C., a substituted polymer of a monoolefinic hydrocarbon selected from the group consisting of ethylene, propylene, and isobutylene, the polymer having a salt-forming substituent other than a halogen and a substituent selected from the group consisting of halogen, hydrocarbon and acyloxy groups, rosin, an accelerator and an antioxidant, the composition containing per 100 parts of the substituted polymer from 10 to 60 parts of polyvalent metal compound selected from the group consisting of polyvalent metal oxides and polyvalent metal hydroxides.

22. The process of claim 21 in which the curing is effected under a pressure of between 15 and 500 pounds per square inch for from 5 to 60 minutes.

AMBROSE McALEVY.
DANIEL E. STRAIN.
FRANKLIN S. CHANCE, Jr.

REFERENCES CITED

The following references are of record in the file of this patent:

UNITED STATES PATENTS

| Number | Name | Date |
|---|---|---|
| 2,212,786 | McQueen | Aug. 27, 1940 |

FOREIGN PATENTS

| Number | Country | Date |
|---|---|---|
| 545,500 | British | May 27, 1942 |